United States Patent [19]

Van House

[11] 4,096,696
[45] Jun. 27, 1978

[54] VEHICLE POWER BRAKE SYSTEM WITH MASTER BOOSTER AND SLAVE BOOSTER

[75] Inventor: Robert M. Van House, Dayton, Ohio

[73] Assignee: General Motors Corporation, Detroit, Mich.

[21] Appl. No.: 751,048

[22] Filed: Dec. 10, 1976

[51] Int. Cl.² ............................................ B60T 13/00
[52] U.S. Cl. ...................................... 60/547; 60/558; 60/581; 188/357; 303/6 R
[58] Field of Search ....................... 188/345, 356, 357; 303/6 R; 60/547, 551, 558, 581, 575, 579, 591, 563, 546

[56] References Cited

U.S. PATENT DOCUMENTS

| 2,526,236 | 10/1950 | Ingres | 188/357 X |
| 2,929,363 | 3/1960 | Stelzer | 60/547 X |
| 3,416,314 | 12/1968 | Cripe | 60/558 X |
| 3,799,303 | 3/1974 | Stoltman | 192/3 M |

FOREIGN PATENT DOCUMENTS

| 535,305 | 10/1955 | Italy | 188/357 |

*Primary Examiner*—George E. A. Halvosa
*Attorney, Agent, or Firm*—D. D. McGraw

[57] ABSTRACT

The vacuum chamber of the master booster is connected to a slave booster having a chamber also normally below atmospheric pressure. The variable pressure chamber of the master booster is connected to the other chamber of the slave booster through a check valve. The master booster operates a dual master cylinder with one pressurizing chamber connected to the rear brakes and the other pressurizing chamber connected to the master cylinder associated with the slave booster and then to the front brakes. In the first stage of actuation the master booster operates its master cylinder to pressurize the front and rear brakes equally. When a preselected boost level is reached, the pressure increase in the master booster variable pressure chamber will open the check valve and the pressure increase will be delivered to the slave booster. As the slave booster power wall moves, a valve in its master cylinder (which had been permitting front brake pressure to pass through) closes and the slave booster acts together with the pressure delivered to it from the dual master cylinder to increase the pressure delivered to the front brakes at a faster rate of pressure build-up than that delivered to the rear brakes.

4 Claims, 2 Drawing Figures

VEHICLE POWER BRAKE SYSTEM WITH MASTER BOOSTER AND SLAVE BOOSTER

The invention relates to a vehicle power brake system and more particularly to one in which a first differential pressure operated booster actuates a first master cylinder, the first master cylinder being of the dual pressurizing chamber type with separate pressure outputs connected to separate brake actuating circuits. A second differential pressure operated booster is operatively connected with the first booster to receive operating pressures from the first booster. A second master cylinder is arranged to be actuatable by the second booster. The second master cylinder has normally open valve means in one of the brake actuating circuits between the first master cylinder and a brake set actuated by the one brake circuit. The normally open valve means permits brake actuating pressure from the first master cylinder to pass through the second master cylinder to the associated brake set so long as the valve means is open. The valve means is arranged to be closed by initial operation of the second booster, the second master cylinder then being actuatable by operation of the second booster to pressurize the associated brake set in accordance with operation of the second booster. The second booster has means acting only upon the establishment of booster operating pressures of a predetermined pressure differential in the first booster to permit delivery of differential operating pressures from the first booster to the second booster to operate the second booster. The second master cylinder has a piston actuatable by the force of operation of the second booster, the piston also having an effective area responsive to pressure from the first master cylinder when the second master cylinder valve means is closed to provide actuating force on the piston of the second master cylinder in addition to the actuating force generated by operation of the second booster. This arrangement provides a proportioning brake booster and master cylinder assembly with different vehicle brake sets, such as the vehicle front and rear brakes, being pressurized initially by pressures generated in the first master cylinder, and the front wheel brakes being further pressurized by the second brake booster at a higher relative pressure but in accordance with the pressure generated by the first master cylinder and delivered to the vehicle rear wheel brakes.

The brake system embodying the invention is capable of requiring less fluid from the first master cylinder than the conventional brake system in which only one master cylinder and booster assembly is used. This will permit quicker take-up or higher mechanical advantage to be obtained. It will provide a higher pressure run-out due to the added energy of the slave booster. It provides proportioning with the capability of pressurizing the brakes without proportioning below predetermined pressure levels.

Figure 1:
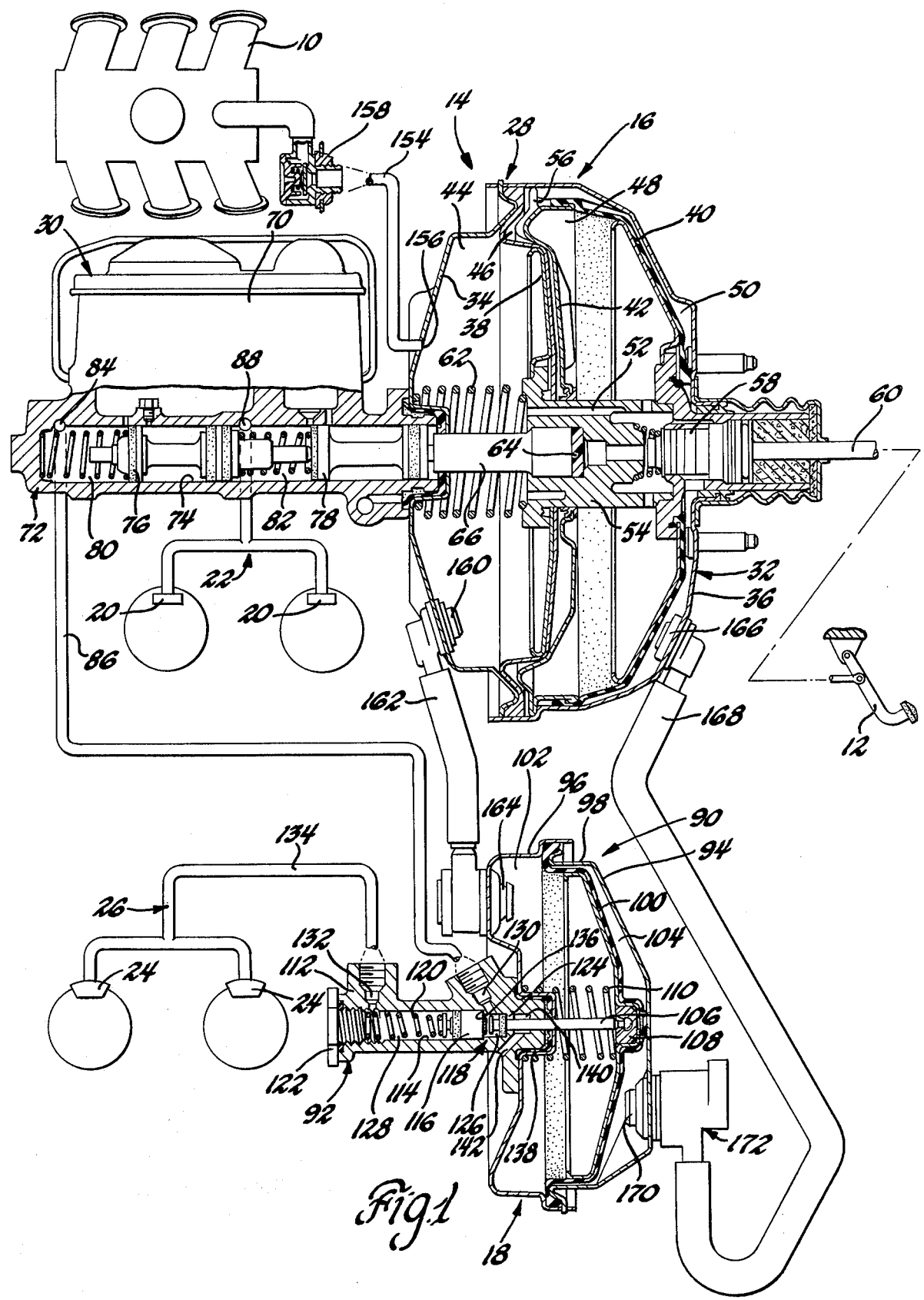
FIG. 1 is an illustration of a vehicle brake system embodying the invention with parts broken away and in section, some parts being schematically illustrated.

The vehicle in which the system embodying the invention is installed has a source of vacuum schematically illustrated as the engine intake manifold 10. A brake pedal 12 is suitably mounted in the vehicle for pedal operation of the system. The brake system 14 includes a first booster and master cylinder assembly 16, a second booster and master cylinder assembly 18, a set of rear brakes 20 having a brake actuating circuit 22, a set of front brakes 24 having a brake actuating circuit 26, and appropriate connecting conduits as will be described.

The first booster and master cylinder assembly 16 is generally similar to current production types of brake booster and master cylinder assemblies. It includes the first brake booster 28 and the first master cylinder 30. Booster 28 has a housing 32 defined by housing front wall 34 and housing rear wall 36. Power walls 38 and 40 are positioned in housing 32 and separated by a divider 42 so that the housing has a front vacuum chamber 44 and a front variable pressure chamber 46 on opposite sides of power wall 38, a rear vacuum chamber 48 separated from the front variable pressure chamber 46 by divider 42, and a rear variable pressure chamber 50. Chambers 48 and 50 are on opposite sides of power wall 40. The vacuum chambers 44 and 48 are considered to be constant pressure chambers and are interconnected by passage means 52 in the booster power piston 54 on which power walls 38 and 40 are mounted. The variable pressure chambers 46 and 50 are interconnected by passage means 56 formed in part by housing 32 and divider 42. The booster control valve assembly 58 is positioned within the booster piston 54 and is arranged to be actuated by push rod 60, which is connected to brake pedal 12. The booster is operated in the well known manner of the vacuum suspended tandem power wall booster. The booster power piston has a return spring 62 located in chamber 44, a reaction mechanism 64, and an output member 66.

The master cylinder 30 is connected to booster housing 32. Master cylinder 30 has a housing 68 with a brake fluid reservoir 70 and a brake fluid pressurizing section 72. The pressurizing section has a bore 74 receiving tandemly arranged pressurizing pistons 76 and 78. Bore 74 and pressurizing piston 76 define pressurizing chamber 80. Pistons 76 and 78 cooperate with bore 74 to define pressurizing chamber 82. The brake booster output member 66 is arranged to engage the rear end of piston 78 and to move the pistons forwardly in bore 74 to pressurize brake fluid in chambers 80 and 82 in a manner well known in the art. Chamber 80 has an outlet 84 connected to a conduit 86 and operatively connected to the front brake actuating circuit 26. Pressurizing chamber 82 has an outlet 88 connected to the rear brake actuating circuit 22.

The second brake booster and master cylinder assembly 18 includes a second brake booster 90 and a second master cylinder 92. Booster 90 has a housing 94 defined by a housing wall 96 and housing rear wall 98. A power wall 100 separates housing 94 into a vacuum or constant pressure chamber 102 and a variable pressure chamber 104. One side of chamber 102 is also defined by housing front wall 96, and one side of chamber 104 is defined by housing rear wall 98. Power wall 100 has an output push rod 106 with its rear end seated in push rod seat 108. Seat 108 is secured to power wall 100. The push rod 106 extends forwardly through the housing front wall 96 and into the second master cylinder 92. A power wall return spring 110 is located in chamber 102 and urges the power wall 100 rearwardly, tending to increase the volume of chamber 102 and decrease the volume of chamber 104.

The second master cylinder 92 has a housing 112 which is suitably secured to the booster houing 94. A bore 114 in housing 112 contains a brake fluid pressurizing piston 116, valve means 118 and a piston return spring 120. The forward end of the bore 114, through which the elements in the bore are inserted during assembly, is closed by a plug 122. The rearward portion of bore 114 has a shoulder 124, the bore extending rearwardly out of housing 112 with a reduced diameter section formed through shoulder 124. Push rod 106 is reciprocably received through the bore reduced diameter section, the push rod extending into the bore beyond shoulder 124. Piston 116 divides the main portion of bore 114 into a valve chamber section 126 and a pressurizing chamber 128. An inlet 130 communicates with valve chamber 126 and is connected with conduit 86 leading from outlet 84 of the first master cylinder 30. A brake fluid outlet 132 communicates with the forward end of pressurizing chamber 128 and is connected by a conduit 134 to brake actuating circuit 26, of which conduit 134 is a part. Return spring 120 is located in chamber 128 and urges piston 116 rearwardly. Bore 114 has another shoulder 136, positioned forwardly of the point where inlet 130 opens into chamber 126, against which the rear end of piston 116 is urged by spring 120. A seal 138 is positioned between the master cylinder housing 112 and the booster housing front wall 96 and seals about push rod 106 to prevent vacuum leaks. A portion of bore 114 rearwardly of shoulder 124 may be enlarged as shown schematically at 140, this enlarged portion being connected with the atmosphere by a vent passage 142 to assure atmospheric venting of any brake fluid which may pass along push rod 106 toward booster 90.

A seal 144 is positioned against the forward side of shoulder 124 and seals against push rod 106. The forward end of the push rod is formed to provide a valve 146, which is a part of valve means 118. A passage 148 extends axially through piston 116 to form a fluid communication passage between chambers 126 and 128. The rearward end of passage 148 is provided with an annular valve seat 150 which is in axial alignment with valve 146 and may be engaged for closure of valve means 118 by forward movement of valve 146. The forward end of piston 116 has a seal 152 providing a master cylinder pressure cup.

Intake manifold 10 is connected by conduit 154 to the first booster vacuum chamber 44 at port 156. A check valve 158 in conduit 154 permits the imposition of vacuum in chamber 44 by intake manifold vacuum, but closes when intake manifold vacuum decreases toward atmospheric pressure in relation to the vacuum already in chamber 44. Vacuum chamber 44 has another port 160 which is connected by a conduit 162 to a port 164 opening into the second booster vacuum chamber 102. Port 164 may include a check valve similar to check valve 158. The variable pressure chamber 50 of the first brake booster 28 has a port 166 which is connected by conduit 168 to port 170 opening into the variable pressure chamber 104 of second brake booster 90. A check valve assembly 172 has a housing 174 provided with chambers 176, 178, 180 and 182. A tube 184 has a passage 186 opening into chamber 176. Conduit 168 is secured to tube 184 so that it connects the first booster variable pressure chamber 50 with chamber 176. A port 188 in one end of chamber 176 opens into chamber 178. The other end of chamber 176 is formed to provide a valve seat 190 against which a check valve 192 is continually urged by valve spring 194. Valve 192 and spring 194 are contained in chamber 182, the valve being positioned toward one chamber end in cooperative relationship with valve seat 190. Port 170 is formed in the other end of chamber 182. Chamber 182 is in continuous fluid communication with chamber 180 at one end of chamber 180. The other end of chamber 180 is formed to define a valve seat 196 against which a check valve 198 is urged by a valve spring 200. Valve 198 and spring 200 are contained in chamber 178. A suitable valve guide 202 is provided as a part of the valve assembly cap 204 which forms one wall of chamber 178. The cap may be snapped in place, with seal 206 sealing chamber 178. A similar cap 208 provides a valve guide 210 for valve 192 and has a seal 212 which seals chamber 180 from atmosphere. The check valve assembly is secured to housing rear wall 98 of booster 90 by a retainer 214.

The system is illustrated in the brake release position. Under normal conditions of operation the vacuum from the intake manifold 10 is impressed in vacuum chambers 44 and 48 of booster 28 and vacuum chamber 102 of booster 90. The check valve 158 prevents a loss of vacuum in these chambers as the engine throttle is opened or for some other reason the engine intake manifold vacuum approaches atmospheric pressure. Since the control valve 58, as is well known in the art, prevents atmospheric air pressure from entering variable pressure chambers 46 and 50, and connects the vacuum chambers with those variable pressure chambers through appropriate passages, the same vacuum pressure is impressed in chambers 46, 50, and 104 as exists in vacuum chambers 44, 48, and 102. The boosters are therefore of the vacuum suspended type. When the master cylinder 30 and 92 are in the inactive position illustrated their pressurizing chambers are not generating brake actuating pressures. Valve means 118 of master cylinder 92 is open to provide a fluid path from inlet 130 through chamber 126 and passage 148 to chamber 128, with outlet 132 connecting chamber 128 with the brake actuating circuit 26 and the front brakes 24.

Upon actuation of the system by the vehicle operator by movement of brake pedal 12 in the brake actuating direction, push rod 60 actuates control valve 58 to close the connection between the vacuum chambers and the variable pressure chambers of booster 28, and then opens the variable pressure chambers 46 and 50 to permit modulated atmospheric air pressure to enter. This valve action is typical of vacuum suspended boosters currently in production. The differential pressure generated across the power walls 38 and 40 by this action generates forces overcoming return spring 62 and acting through output member 66 to move master cylinder piston 78 leftwardly as seen in FIG. 1. Upon sufficient piston movement to close its associated compensating port, the piston 78 begins to pressurize fluid in chamber 82. This pressurized fluid acts on the secondary piston 76 as well as being delivered to the brake actuating circuit 22 for the rear brakes 20. This causes movement of piston 76 leftwardly so that after closing its associated compensating port it pressurizes brake fluid in chamber 80. This fluid pressure is delivered through outlet 84 and conduit 86 to the inlet 130 of master cylinder 92. Since valve means 118 is open, this pressure is delivered through chamber 126, passage 148, chamber 128, and outlet 132 to the front brake actuating circuit 26. Thus both the front and rear brakes are initially pressurized by fluid pressure generated in the master cylinder 30.

The increase in absolute pressure in variable pressure chamber 50 is transmitted through port 166 and conduit 168 to the check valve assembly 172. The pressure passes through passage 186 so that it exists in chambers 176 and 178. Since at this time check valves 192 and 198 are closed, the pressure is not transmitted to variable pressure chamber 104. Although valve 198 has a very light valve spring 200 so that the valve will readily open in one direction to a slight pressure differential and therefore keep chamber 104 charged with vacuum when the system is in the release position, the valve is kept closed by the pressure differential acting across it as the absolute pressure increases in chamber 178. Spring 194 is calibrated relative to the effective area of valve 192 exposed to chamber 176 so that a predetermined pressure differential between chamber 176 and chamber 182 is required before valve 192 will open. The determination of this pressure differential also determines the point at which the system begins its brake pressure proportioning action to increase the front brake pressure at a faster rate than the rear brake pressure.

Figure 2:
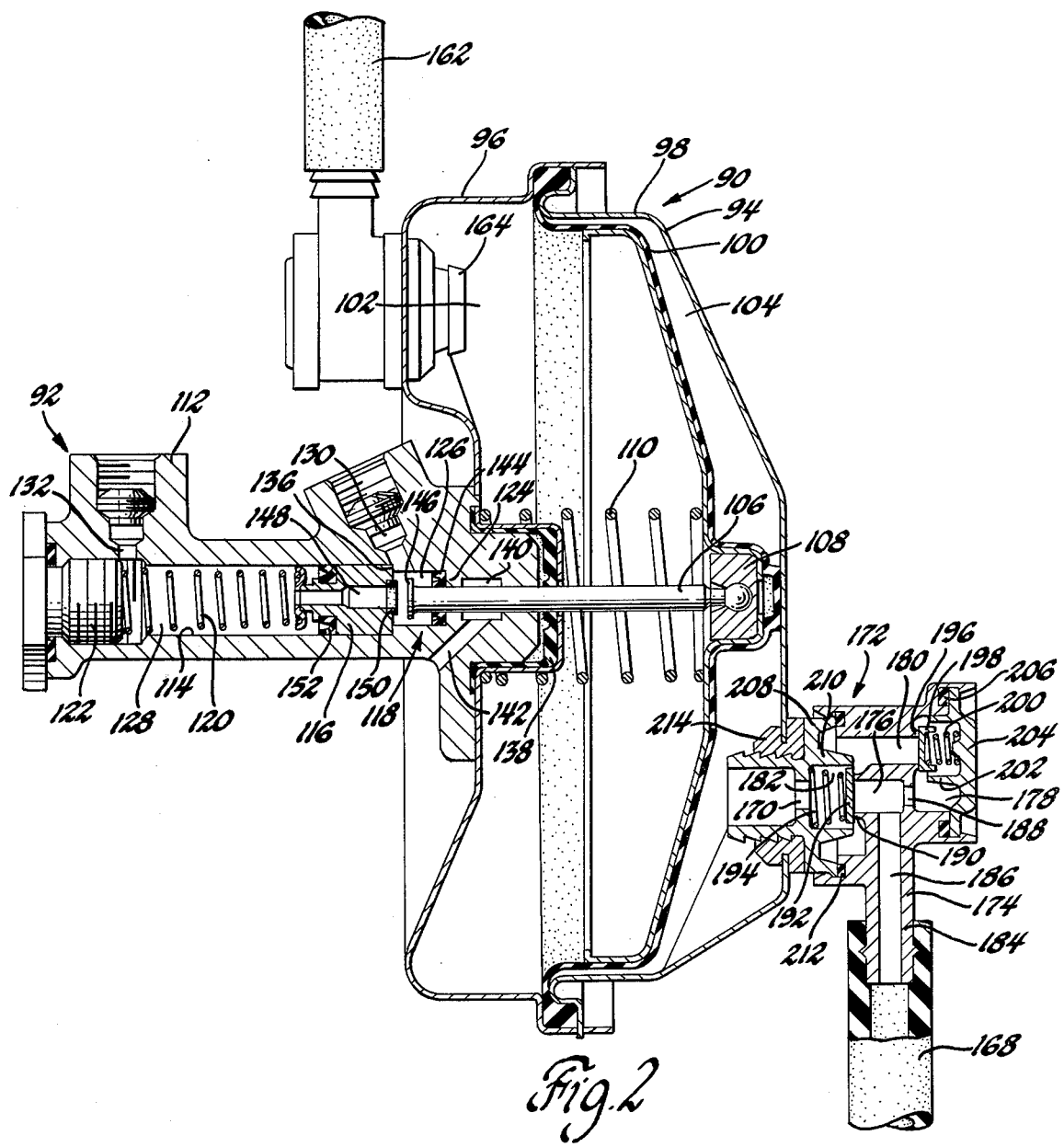
FIG. 2 is a view with parts broken away and in section and illustrating the secondary or slave booster and master cylinder portion of the system of FIG. 1 in greater detail.

Once the pressure in the first booster chamber 50 increases sufficiently to cause valve 192 to open, this higher absolute pressure is transmitted through chamber 182 and port 170 into chamber 104 of booster 90. This creates a pressure differential acting on the booster power wall 100, moving the power wall and push rod 106 leftwardly, as seen in FIG. 2, against the force of return spring 110. Sufficient movement causes valve 146 to seat against valve seat 150, closing the fluid connection between inlet 130 and chamber 128. However, the fluid pressure transmitted through inlet 130 into chamber 126 acts against the right end of piston 116, urging the piston leftwardly. This provides pressure support to the extent of pressurization obtained in chamber 128 at the time valve 146 is seated on its seat 150. This support also increases with increasing pressure generation in the first master cylinder chamber 80. As the absolute pressure increases in chamber 50 of booster 28 due to further movement of brake pedal 12 in the brake actuating direction, the absolute pressure likewise increases in chamber 104, causing further leftward movement of power wall 100 and push rod 106. This force acts directly on piston 116 through valve seat 150, causing additional fluid pressurization in chamber 128. This pressure increase is delivered to the front brakes 24 through brake actuating circuit 26. This area ratio between the power wall 100 and piston 116 is arranged so that the pressure in chamber 128 will increase at a faster rate than will the pressure in brake actuating circuit 22 and conduit 86, thus providing a proportioning booster operation.

The point at which proportioning action begins is determined by the preload on check valve spring 194. When the proportioning action is to begin at the same point under all conditions, the spring preload is set accordingly. It is to be understood that should variations of proportioning action be desirable due to other conditions, the preload on spring 194 may be varied in accordance with such conditions. For example, the spring preload on spring 194 may be varied by an inertia mass for inertia proportioning, by a vehicle load sensor for vehicle load proportioning, or by a manual control if it is desired to modify the proportioning action manually after installation in the vehicle.

What is claimed is:

1. A brake system in a vehicle having first and second brake actuating circuits for actuating first and second brake sets, said system comprising:
   a first differential pressure operated booster having first and second operating pressures;
   a first master cylinder actuatable by said first booster and having first and second brake actuating pressure outputs respectively connected to said first and second brake actuating circuits;
   a second differential pressure operated booster operatively connected with said first booster to receive said first and second operating pressures therefrom and having means acting only upon the establishment of operating pressures of a predetermined differential in said first booster to permit delivery of said differential operating pressures from said first booster to said second booster to operate said second booster;
   a second master cylinder actuatable by the operation of said second booster and having normally open valve means in said second brake actuating circuit fluidly intermediate said first master cylinder second brake actuating pressure output and the second brake set;
   said normally open valve means permitting brake actuating pressure to pass through said second master cylinder from said first master cylinder to the second brake set while open, and arranged to be closed by initial operation of said second booster, said second master cylinder being actuatable by operation of said second booster when said valve means is closed to pressurize the portions of said second brake actuating circuit from said second master cylinder to the second brake set in accordance with operation of said second booster.

2. A brake system in a vehicle having first and second brake actuating circuits for actuating first and second brake sets, said system comprising:
   a first differential pressure operated booster having first and second operating pressures;
   a first master cylinder actuatable by said first booster and having first and second brake actuating pressure outputs respectively connected to said first and second brake actuating circuits;
   a second differential pressure operated booster operatively connected with said first booster to receive said first and second operating pressures therefrom and having means acting only upon the establishment of operating pressures of a predetermined differential in said first booster to permit delivery of said differential operating pressures from said first booster to said second booster to operate said second booster;
   a second master cylinder actuatable by the operation of said second booster and having normally open valve means in said second brake actuating circuit fluidly intermediate said first master cylinder second brake actuating pressure output and the second brake set;
   said normally open valve means permitting brake actuating pressure to pass through said second master cylinder from said first master cylinder to the second brake set while open, and arranged to be closed by initial operation of said second booster, said second master cylinder being actuatable by operation of said second booster when said valve means is closed to pressurize the portions of said second brake actuating circuit from said second master cylinder to the second brake set in accordance with operation of said second booster;

said second master cylinder having actuating pressure generating piston means therein actuatable by the force of operation of said second booster, said piston means having an effective area responsive to pressure from said first master cylinder second brake actuating pressure output when said valve means is closed to provide another actuating force on said piston means in addition to the actuating force of operation of said second booster.

3. A proportioning brake booster and master cylinder assembly comprising:

a differential pressure operated primary brake booster having first and second operating pressures;

a dual pressurizing chamber primary master cylinder having one pressurizing chamber connected to operate a vehicle rear wheel brake set and another pressurizing chamber connected to operate a vehicle front wheel brake set;

a differential pressure operated secondary brake booster having the pressure operating chambers thereof fluid connected with their comparable pressure operating chambers of said primary brake booster, means for disconnecting one pressure operating chamber of said secondary brake booster from its primary brake booster comparable chamber during a first range of operation of said primary brake booster and for reconnecting the same during a second range of operation of said primary brake booster to actuate said secondary brake booster by said first and second operating pressures;

a secondary master cylinder having a piston in a bore and dividing the bore into first and second pressure chambers and having a passage therethrough connecting said first and second pressure chambers, a normally open valve closing said passage upon actuation of said secondary brake booster, said first pressure chamber being connected in continuous fluid communication with the other pressurizing chamber of said primary master cylinder, said second pressure chamber being connected in continuous fluid communication with the vehicle front wheel brake set;

said secondary brake booster actuating on said secondary master cylinder piston after closure of said valve to increase the pressure of fluid in said second pressure chamber and therefore increase the brake actuating pressure delivered to the vehicle front wheel brake set relative to the pressure delivered to the vehicle rear wheel brake set.

4. In a brake booster system having a first assembly defined by a first brake booster and a first master cylinder actuatable thereby, the first brake booster having a power wall with a substantially constant pressure chamber on one side and a variable pressure chamber on the other side and means for varying the pressure in the variable pressure chamber to actuate the first booster and thus actuate the first master cylinder, the first master cylinder having first and second brake fluid pressurizing chambers for pressurizing brake fluid in separate brake circuits respectively containing first and second brake sets, the improvement comprising:

a second assembly defined by a slave second brake booster and a second master cylinder actuatable thereby;

said slave booster having a power wall with a substantially constant pressure chamber on one side and a variable pressure chamber on the other side and an output member movable by movement of said power wall and extending into said second master cylinder, said second master cylinder having a bore, a piston reciprocably movable in said bore and dividing said bore into a first chamber and a second chamber and having a hydraulic fluid passage extending therethrough and fluid connecting said first and second chambers, the end of said passage opening into said first chamber defining a valve seat and the end of said slave booster output member extending into said second master cylinder defining a valve element in said first chamber aligned to open and close said valve seat, spring means holding said valve element away from said valve seat until said slave booster is actuated and yielding upon actuation of said slave booster to permit closing engagement of said valve element with said valve seat to close said passage and prevent fluid transfer between said first and second chambers of said second master cylinder, said second master cylinder first chamber having a fluid inlet in continuous fluid cmmunication with said first master cylinder second chamber and said second master cylinder second chamber being in continuous fluid communication with said second brake set, said second master cylinder piston being movable by said slave booster output member upon actuation of said slave booster and closure of said valve seat to pressurize fluid in said second master cylinder second chamber, first conduit means providing continuous pressure communication between the substantially constant pressure booster chambers, second conduit means connecting the variable pressure booster chambers and having a first check valve maintaining said second conduit means open only so long as the pressure in said first booster variable pressure chamber is substantially the same as the pressure in said first and second booster substantially constant pressure chambers, a second normally closed check valve opened at a predetermined pressure change in said first booster variable pressure chamber to admit the pressure change to said second booster variable pressure chamber to actuate said second booster, said second brake set thereby being actuated initially by pressure from said first master cylinder second pressurizing chamber passing through said second master cylinder and subsequently by pressure generated in said second master cylinder second chamber by actuation of said second booster.

* * * * *

UNITED STATES PATENT AND TRADEMARK OFFICE
CERTIFICATE OF CORRECTION

PATENT NO. : 4,096,696
DATED : June 27, 1978
INVENTOR(S) : Robert M. Van House

It is certified that error appears in the above–identified patent and that said Letters Patent are hereby corrected as shown below:

Col. 3, line 4, "houing" should read -- housing --.

Col. 4, line 37, "cylinder" should read -- cylinders --.

Col. 7, line 49, Claim 3, "actuating" should read -- acting --.

Col. 8, line 33, Claim 4, "cmmunication" should read -- communication --.

Signed and Sealed this

Sixth Day of March 1979

[SEAL]

Attest:

RUTH C. MASON
Attesting Officer

DONALD W. BANNER
Commissioner of Patents and Trademarks